United States Patent [19]

Kidder

[11] Patent Number: 5,492,966
[45] Date of Patent: Feb. 20, 1996

[54] IMPACT MODIFIED RESIN COMPOSITIONS CONTAINING LOBED GRAFT COPOLYMERS AND PROCESS FOR THE MAKING THEREOF

[75] Inventor: Kevin R. Kidder, Parkersburg, W. Va.

[73] Assignee: General Electric Company, Pittsfield, Mass.

[21] Appl. No.: 863,633

[22] Filed: Apr. 3, 1992

[51] Int. Cl.$^6$ .......................... C08F 2/16; C08F 279/04; C08L 33/20
[52] U.S. Cl. ...................... 525/86; 525/80; 525/83; 525/84; 525/308; 525/310; 525/316; 524/458
[58] Field of Search .................. 525/86, 80, 83, 525/84, 308, 310, 316; 524/458

[56] References Cited

U.S. PATENT DOCUMENTS

| | | | |
|---|---|---|---|
| 4,145,380 | 3/1979 | Myers et al. | 525/310 |
| 4,173,600 | 11/1979 | Kishida et al. | 525/84 |
| 4,473,679 | 9/1984 | Falk et al. | 525/310 |
| 4,634,734 | 1/1987 | Hambrecht et al. | 525/86 |
| 4,703,090 | 10/1987 | Ferraresi et al. | 525/250 |
| 4,740,560 | 4/1988 | Moore et al. | 525/86 |
| 4,771,107 | 9/1988 | Hoenl | 525/86 |
| 4,882,383 | 11/1989 | Ting | 525/80 |
| 5,104,936 | 4/1992 | Blumenstein et al. | 525/86 |

FOREIGN PATENT DOCUMENTS

| | | |
|---|---|---|
| 0254467 | 7/1987 | European Pat. Off. . |
| 0485771 | 10/1991 | European Pat. Off. . |
| 2060662 | 10/1980 | United Kingdom . |

OTHER PUBLICATIONS

Chen et al., Interfacial Phenomena Controlling Particle Morphology of Composite Latexes, Journal of Applied Polymer Science, vol. 42, 1049–1063 (1991).

*Primary Examiner*—Paul R. Michl
*Assistant Examiner*—Olga Asinovsky

[57] ABSTRACT

Impact modified resin compositions are provided containing bi-lobed graft copolymers. The lobed graft copolymers contain a rigid lobe and a rubbery lobe. The rubber lobes exhibit an affinity for each other and tend to agglomerate during compounding resulting in large rubber particle sizes which provide the compositions with reduced gloss. The resin compositions are useful as molding resins.

4 Claims, No Drawings

IMPACT MODIFIED RESIN COMPOSITIONS CONTAINING LOBED GRAFT COPOLYMERS AND PROCESS FOR THE MAKING THEREOF

BACKGROUND OF THE INVENTION

1. Field of the Invention

The present invention relates to resin compositions containing graft copolymers, and more particularly relates to impact modified resin compositions containing bi-lobed graft copolymers and process for the making thereof.

2. Description of the Related Art

Core-shell graft copolymers derived from styrene and acrylonitrile grafted onto polybutadiene rubber are known; core-shell polymers having a rigid core and a rubbery acrylic shell are known, see U.S. Pat. No. 4,473,679; and use of core-shell graft copolymers in resin compositions to impact modify rigid copolymers derived from styrene and acrylonitrile resin is known. Large rubber particle sizes are desired to form low gloss resin compositions and to impart good impact properties in resin compositions, but formation of large particle sizes by conventional processes typically requires long polymerization times.

SUMMARY OF THE INVENTION

The present invention provides impact modified resin compositions comprising free rigid polymers and bi-lobed graft copolymers and a process for the making thereof. The lobed graft copolymers have a lobe of rubber which is chemically bound to a lobe of rigid polymer. When the lobed graft copolymer is compounded in free rigid polymer, the lobes of rubber exhibit an affinity for each other and thereby agglomerate to form large rubber particles. The lobed graft copolymers are prepared by (a)emulsion polymerizing vinyl monomers preferably with a small amount of a polyene grafting agent to form a latex of rigid polymeric seed having vinyl functionality; and (b)polymerizing diene monomer in the presence of the seed to form graft copolymers having a rigid lobe and a rubbery lobe. Isolating the rigid graft portion to one area of an ABS graft copolymer relative to the rubbery polybutadiene particle during grafting is difficult without special grafting procedures or low levels of grafting. However, this two-lobed or "dumbbell" morphology can be observed when attempting to graft butadiene onto rigid styrene-butadiene-acrylonitrile terpolymer particles in emulsion reactions.

DETAILED DESCRIPTION OF THE INVENTION

The bi-lobed graft copolymer of the present invention comprises a rigid lobe and a rubbery lobe. Preferably the rigid lobe is present at a level of from 10 to 90 weight percent based on the total weight of the lobed graft copolymer, more preferably at a level of from 25 to 75 weight percent thereof, and most preferably at a level of from 40 to 60 weight percent thereof; and preferably the rubbery lobe is present at a level of from 10 to 90 weight percent based on the total weight of the lobed graft copolymer, more preferably at a level of from 25 to 75 weight percent thereof, and most preferably at a level of from 40 to 60 weight percent thereof. Resin compositions comprising the lobed graft copolymer as an impact modifier, further comprise a free rigid polymer which forms a rigid polymeric matrix. In order to provide a good combination of physical properties, the resin compositions comprise from 5 to 95 weight percent lobed graft copolymer based on the total weight of the resin composition, more preferably from 20 to 80 weight percent thereof, and most preferably from 30 to 70 weight percent thereof; and preferably comprises from 5 to 95 weight percent free rigid polymer based on the total weight of the resin composition, more preferably from 20 to 80 weight percent thereof, and most preferably 30 to 70 weight percent thereof. Theoretical considerations for making lobed graft copolymers are set out in Chen et al, Interfacial Phenomena Controlling Particle Morphology of Composite Latex, Journal of Applied Polymer Science, Vol. 42, 1049–1063(1991) which is incorporated herein by reference.

Suitable rubbery lobes include rubbery polymers and copolymers of conjugated dienes, alkylacrylate polymers, and copolymers of ethylenically unsaturated olefins and other monomers suitable for making rubbers by emulsion polymerization. Preferably, the rubbery polymers comprises polybutadiene, a polybutadiene-styrene copolymer, or a polybutylacrylate. The rubbery lobe preferably comprises cross-linked forms of these polymers. The rubbery polymer preferably has a glass transition temperature below 0° C. The rubbery polymer is preferably prepared by polymerizing a conjugated diene, such as butadiene or a conjugated diene with a monomer copolymerizable therewith, such as styrene, to provide a rubbery lobe. The rubbery polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

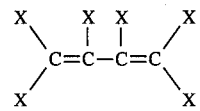

wherein X is selected from the group consisting of hydrogen, alkyl groups containing from one to give carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is 1,3-butadiene. These diene monomers are also suitable as the diene grafting agent for the rigid polymeric seed.

The monomers for the rubbery lobe are polymerized in the presence of the rigid polymer seed which will form the rigid lobe in the lobed graft polymer.

One monomer or group of monomers that may be polymerized to form the rigid polymer seed and the free rigid polymer are monovinylaromatic hydrocarbons. The monovinylaromatic monomers utilized are generically described by the following formula:

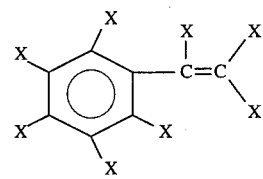

wherein X is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, para methylstyrene, α-methylstyrene, 3,5-diethylstyrene, 4-n-propylstyrene, α-methyl vinyltoluene, α-chlorostyrene, α-bromostyrene, dichlorostyrene, dibromostyrene, tetrachlorostyrene, mixtures thereof, and the like. The preferred monovinylaromatic hydrocarbons used are styrene and/or α-methylstyrene.

A second group of monomers that may be polymerized to form the rigid seed and the free rigid polymer are vinyl cyanide monomers such as acrylonitrile and substituted acrylonitrile, and acrylic monomers such as acrylic acid esters and alkyl acrylates such as methyl methacrylate.

The vinyl cyanide and acrylic monomers are described generically by the following formula:

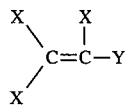

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, and β-bromoacrylonitrile, methyl acrylate, alkyl methacrylate, ethyl acrylate, butyl acrylate, propylacrylate, isopropyl acrylate and mixtures thereof. The preferred vinyl cyanide monomer is acrylonitrile and the preferred acrylic acid esters are ethyl acrylate and methyl methacrylate.

The rigid lobe formed from the rigid seed, is chemically bound to the rubbery lobe and is preferably formed from two or more vinyl monomers from the following groups: monovinyl aromatic monomers including halogen-substituted vinyl aromatic monomers and alkyl-substituted vinyl aromatic monomers; vinyl cyanide monomers including acrylonitrile and substituted acrylonitriles; ethylenically unsaturated carboxylic acids, diacids, dianhydrides, acid esters, diacid esters, amides, imides and N-substituted imides; and acrylates including alkylacrylates. These vinyl functional monomers are also suitable for forming the free rigid polymer. It is preferred that the rigid polymer seed, and thus the rigid lobe, be formed from at least one monomer selected from the group consisting of styrene, α-methylstyrene, halogen-substituted styrene, and methyl methacrylate, and optionally from about 5 to about 40 weight percent of at least one different monomer selected from the group consisting of acrylonitrile, methyl methacrylate, maleic anhydride, maleimide, N-phenyl malemide and acrylamide, and a minor amount (less than 50 weight percent) of at least one grafting agent. Preferably the grafting agent is selected from polyenes including the diene monomers set out above for the rubbery lobe and other dienes such as those forming rigid type polymeric materials such as divinyl benzene, divinyl sulfane etc, and trivinyl compounds such as triallyl benzene tricarboxylate, triallyl cyanurate, triallyl isocyanurate and triallyl triazine trione, and the like. Additionally, it is preferred that the free rigid polymer be formed from at least one monomer selected from the group consisting of styrene, α-methylstyrene and dibromostyrene, and from acrylonitrile. Preferred copolymers for the matrix polymer include, but are not limited to, the following: styrene-acrylonitrile; styrene-acrylonitrile-maleic anhydride; styrene-α-methylstyrene-acrylonitrile; styrene-α-methylstyrene-acrylonitrile-N-phenyl maleimide; styrene-acrylonitrile-N-phenyl maleimide; styrene-acrylonitrile-N-phenyl maleimide-maleic anhydride; styrene-methyl methacrylate-acrylonitrile; styrene-methyl methacrylate-acrylonitrile-maleic anhydride; styrene-methyl methacrylate-α-methylstyrene-acrylonitrile; styrene-methyl methacrylate-α-methylstyrene-acrylonitrile-N-phenyl maleimide; styrene-methyl methacrylate-acrylonitrile-N-phenyl maleimide; styrene-methyl methacrylate-acrylonitrile-N-phenyl maleimide-maleic anhydride; styrene-dibromostyrene-acrylonitrile; styrene-dibromostyrene-acrylonitrile; styrene-dibromostyrene-acrylonitrile-maleic anhydride; styrene-dibromostyrene-α-methylstyrene-acrylonitrile; and styrene-dibromostyrene-acrylonitrile-N-phenyl maleimide.

The rigid polymer seed is formed by emulsion polymerizing a minor amount of a polyene grafting agent and a major amount of vinyl functional monomer selected from the group consisting of vinyl aromatic monomers, vinyl cyanide monomers, and ethylenically unsaturated monomers including vinyl anhydride, vinyl esters, vinyl amides, vinyl imides, and acrylates. Preferably the polyene grafting agent is a diene grafting agent and is present at a level of from 0.1 to 49.9 weight percent based on the total weight of the seed, more preferably from 5 to 40 percent by weight thereof, and most preferably from 10 to 30 weight percent thereof.

Preferably the rigid polymer seed is formed from styrene, acrylonitrile and from 0.1 to 49 weight percent 1,3-butadiene grafting agent based on the total weight of the seed. The seed is what represents the rigid lobe. After the seed is formed, diene monomer, preferably 1,3-butadiene, is then reacted in the presence of the seed to form the rubber lobe grafted to the rigid lobe.

It is contemplated that the shape of the graft copolymer is similar to that of two spherical soap bubbles which contact each other to form a common interface. The lobes appear to be somewhat hemispherical in shape, resembling two halves of a prolate spheroid wherein the two lobes have a common interface on the surface of the spheroid along a plane perpendicular to the major axis of the spheroid. This lobed arrangement, instead of a core shell arrangement, allows for agglomeration of the lobed graft copolymers when compounded with rigid matrix copolymer to form an impact modified resin composition. It is contemplated that the lobes of rubber will attract each other and form a cluster of rubber lobes which will act as a large agglomerated rubber particle. As mentioned before, it is often desirable to have large size rubber particles for improved impact strength and for reduced gloss.

In the resin composition, the free rigid matrix polymer is preferably formed from styrene and acrylonitrile. More preferably, the rigid matrix polymer is formed from at least about 50 weight percent of one or more monomers selected from the group consisting of styrene, α-methylstyrene and halogen-substituted styrene, and at least 15 weight percent acrylonitrile. Preferably, the rigid matrix polymer is formed from 20 to about 40 weight percent acrylonitrile. The rigid matrix polymer may further include at least one additional monomer, for example maleic anhydride, methyl methacrylate and/or a maleimide, for example N-phenyl maleimide, as long as the rigid matrix polymer includes at least 20 weight percent acrylonitrile based on the total weight of the rigid polymer. In a further preferred embodiment, the rigid matrix polymer is formed from styrene monomer and at least one monomer selected from α-methylstyrene and halogen-substituted styrene, in addition to the acrylonitrile.

Of course other polymers can be incorporated within these compositions including such polymers as aromatic polycarbonates, and thermoplastic polyesters, such as poly-(butylene terephthalate).

EXAMPLES

Example 1

A series of rigid polymer latices having compositions of 15/40/45, 17.5/30/52.5, 20/20/60, and 22.5/10/67.5 (weight ratio of A/B/S) were prepared by batch emulsion polymerization of acrylonitrile (A), styrene (S), and varying small amounts 1,3-butadiene (B) as grafting/crosslinking agent in the presence of potassium oleate using potassium persulfate as initiator. These latex particles were then used as seeds onto which 1,3-butadiene was polymerized. Transmission electron microscopy of the resulting latices showed that the resultant graft copolymers have two lobes: a "SAN-rich" lobe which is stained to a small degree (if at all) with osmium tetroxide, and a heavily stained (polybutadiene) lobe. The particles appeared as prolate spheroids wich sharp division between the two lobes; a small waist was visible where the two phases meet in some of the particles.

These impact modifiers have the additional advantage of being rapidly prepared at high conversion.

Example 2

A 20 gallon reactor was evacuated and demineralized water, 84; tetrasodium pyrophosphate, 0.2136; potassium oleate, 2.1; tertiary-dodecylmercaptan, 0.12; styrene, 27.0; aryclonitrile, 9.0; and 1,3-butadiene, 24.0 pounds were charged. The temperature was raised to 120° F. and potassium peroxysulfate (1.3% solution), 6.084 pounds was added. After 5 hours the temperature was raised to 155° F. for 2 additional hours. The resulting latex had attained 94.8% conversion of monomer and an average particle size of 80 nm by turbidity.

To 88.64 pounds of the above latex were added demineralized water, 21.72; potassium oleate, 0.96; tetrasodium pyrophosphate, 0.09; tertiary-dodecylmercaptan, 0.078; and 1,3-butadiene, 25.2 pounds. After raising the temperature to 145° F., potassium peroxysulfate (1.5% solution), 6.09 pounds was added. After 7 hours the reaction mixture was cooled. A conversion of monomer to 99.0% as determined by solids was obtained.

The bi-lobed graft copolymer was isolated by coagulation to obtain a powder which was tacky and would fuse if compressed when warm.

Example 3

The bi-lobed graft copolymer latex in Example 2 was further grafted with 7.5 parts of styrene, and 2.5 parts of acrylonitrile based on 100 parts of the final graft polymer composition. Ease of isolation was improved in this composition.

Example 4

The bi-lobed graft copolymer latex in Example 2 was further grafted with 15 parts of styrene, and 5 parts of acrylonitrile based on 100 parts of the final graft polymer composition.

Example 5

The bi-lobed graft copolymer in Example 2 was further grafted with 22.5 parts of styrene, and 7.5 parts of acrylonitrile based on 100 parts of the final graft polymer composition.

The dried resins obtained from examples 2, 3, 4, and 5 were compounded into free rigid SAN using a twin screw extruder. Injection molded, notched izod values decreased as the amount of subsequent grafting increased. Electron microscopy showed a corresponding decrease in agglomeration of the rubber as subsequent grafting monomer was increased.

Materials in Examples 6, 7, 8 and 9 were prepared as in Example 3 in larger quantities in order to permit more extensive evaluations. Materials in Examples 10, 11, 12, 13, 14, and 15 were prepared as in Example 4 in larger quantities in order to permit more extensive evaluations. Results of the evaluations are given in Tables 1, 2, and 3 for the respective materials.

TABLE 1

Preparation and Properties of ABS Based on "Two-Lobed" Impact Modifiers

| Example | 6 | 7 | 8 | 9 |
|---|---|---|---|---|
| SAN | 60.3 | 47.1 | 66.9 | 73.6 |
| LGP 3 | 39.7 | 52.9 | 33.1 | 26.4 |
| Mg Stearate | 0.5 | 0.5 | 0.5 | 0.5 |
| EBS Wax | 1.0 | 1.0 | 1.0 | 1.0 |
| % BD lobe in ABS | 15.0 | 20.0 | 12.5 | 10.0 |
| % BD Total | 23.3 | 31.0 | 19.4 | 15.5 |
| IM Izod | | | | |
| R.T. | 8.3 | 9.0 | 6.3 | 2.5 |
| 0° F. | 1.6 | 2.3 | 1.3 | 1.00 |
| −20° F. | 1.2 | 1.4 | 0.9 | 0.6 |
| −40° F. | 1.1 | 1.4 | 0.7 | 0.5 |
| Dynatup | | | | |
| Fail Pt. ('#) | 27.32 | 21.33 | 22.51 | 17.92 |
| Std. Dev. | 1.78 | 0.96 | 7.03 | 7.41 |
| Total E. ('#) | 28.46 | 22.04 | 25.25 | 22.44 |
| Std. Dev. | 1.47 | 0.89 | 5.50 | 5.26 |
| Failure 50% | 27.98 | 21.63 | 23.14 | 18.68 |
| Std. Dev. | 1.73 | 0.95 | 7.08 | 7.84 |
| Visc. @ 260° C. (Poise) | | | | |
| 100/s | 13200 | 22860 | 11090 | 7360 |
| 500/s | 4470 | 6950 | 3800 | 2760 |
| 1000/s | 2610 | 3810 | 2210 | 1740 |
| Gloss @ 60° F. | | | | |
| 450° F. | 24 | 13*+ | 49 | 57 |
| 500° F. | 20–25** | 10–15** | 44 | 58 |

LGP-3 is Lobed Graft Polymer as prepared in Example 3.
**High degree of variation in surface appearance
*+High degree of variation in appearance, but very consistent readings.

TABLE 2

Preparation and Properties of ABS Based on "Two-Lobed" Impact Modifiers

| Example | 10 | 11 | 12 | 13 |
|---|---|---|---|---|
| SAN | 60.3 | 47.1 | 62.8 | 70.2 |
| LGP 4 | 39.7 | 52.9 | 37.2 | 29.8 |
| Mg Stearate | 0.5 | 0.5 | 0.5 | 0.5 |
| EBS Wax | 1.0 | 1.0 | 1.0 | 1.0 |
| % BD lobe in ABS | 13.3 | 17.8 | 12.5 | 10.0 |
| % BD Total | 20.7 | 27.6 | 19.4 | 15.5 |
| IM Izod | | | | |
| R.T. | 1.9 | 3.7 | 1.5 | 1.0 |
| 0° F. | 0.6 | 0.8 | 0.5 | 0.3 |
| −20° F. | 0.5 | 0.5 | 0.2 | 0.2 |
| −40° F. | 0.4 | 0.4 | 0.4 | 0.4 |
| Dynatup | | | | |
| Fail Pt. ('#) | 27.29 | 25.68 | 20.54 | |

TABLE 2-continued

Preparation and Properties of ABS Based on "Two-Lobed" Impact Modifiers

| Example | 10 | 11 | 12 | 13 |
|---|---|---|---|---|
| Std. Dev. | 4.24 | 1.55 | 9.12 | |
| Total E. ('#) | 29.12 | 26.21 | 24.24 | 14.33 |
| Std. Dev. | 3.48 | 1.38 | 6.50 | 4.62 |
| Failure 50% | 27.98 | 25.93 | 21.24 | |
| Std. Dev. | 4.31 | 1.46 | 6.25 | |
| Visc. @ 260° C. (Poise) | | | | |
| 100/s | 12730 | 22000 | 11760 | 7930 |
| 500/s | 4270 | 6470 | 3870 | 3020 |
| 1000/s | 2400 | 3500 | 2250 | 1890 |
| Gloss @ 60° F. | | | | |
| 450° F. | | 47** | 59, 63, 64** | 76 | 79 |
| 500° F. | | 73 | 15*+ | 69 | 64 |

LGP-4 is Lobed Graft Polymer as prepared in Example 4.
**High degree of variation in surface appearance
*+High degree of variation in appearance, but very consistent readings.
The results verify that the properties were reduced as the subsequent grafting level was increased.

TABLE 3

Preparation and Properties of ABS Based on "Two-Lobed" Impact Modifiers

| Example | 14 | 15 |
|---|---|---|
| SAN | 55.4 | 40.5 |
| LGP 4 | 44.6 | 59.5 |
| Mg Stearate | 0.5 | 0.5 |
| EBS Wax | 1.0 | 1.0 |
| % BD lobe in ABS | 15.0 | 20.0 |
| % BD Total | 23.3 | 31.0 |
| IM Izod | | |
| R.T. | 2.1 | 4.7 |
| 0° F. | 0.6 | 0.8 |
| −20° F. | 0.3 | 0.4 |
| −40° F. | 0.5 | 0.4 |
| Dynatup | | |
| Fail Pt. ('#) | 27.43 | 21.90 |
| Std. Dev. | 3.95 | 1.23 |
| Total E. ('#) | 28.76 | 22.59 |
| Std. Dev. | 3.06 | 1.07 |
| Failure 50% | 28.01 | 22.25 |
| Std. Dev. | 3.57 | 1.14 |
| Visc. @ 260° C. (Poise) | | |
| 100/s | 16020 | 30000 |
| 500/s | 4900 | 8440 |
| 1000/s | 2720 | 4330 |
| Gloss @ 60° F. | | |
| 450° F. | 61.00 | 33, 41, 38** |
| 500° F. | 42.00 | 14*+ |

LGP-4 is Lobed Graft Polymer as prepared in Example 4.
**High degree of variation in surface appearance
*+High degree of variation in appearance, but very consistent readings.
The results verify that the properties were reduced as the subsequent grafting level was increased.

Example 16

A bi-lobed graft copolymer was prepared as described in Example 2, except that 40.5 pounds styrene, 13.5 pounds acrylonitrile, and 6.0 pounds of 1,3-butadiene were used to prepare the seed latex. This reaction ran to 96.8% conversion of monomer in 6 hours. This graft copolymer was isolated as a powdery resin by coagulation of the resulting latex. The bi-lobed graft copolymer was compounded into SAN (S/A 72/28, Mw=106,000) with a twin-screw extruder without a subsequent grafting step. The resulting Blends exhibited physical properties as given in Table 4.

TABLE 4

Preparation and Properties of ABS Made from "Two-Lobed" Impact Modifiers

| Example | 17 | 18 | 19 | 20 | 21 |
|---|---|---|---|---|---|
| SAN | 76.2 | 70.1 | 64.3 | 58.3 | 52.4 |
| LGP-16 | 23.8 | 29.8 | 35.7 | 41.7 | 47.6 |
| EBS Wax | 0.5 | 0.5 | 0.5 | 0.5 | 0.5 |
| Mg Stearate | 1.0 | 1.0 | 1.0 | 1.0 | 1.0 |
| % PBD Lobe | 10.0 | 12.5 | 15.0 | 17.5 | 20.0 |
| % BD Total | 11.4 | 14.2 | 17.1 | 19.9 | 22.8 |
| IM Izod ('#/") | | | | | |
| R.T. | 0.7 | 1.2 | 2.9 | 4.5 | 5.1 |
| 0° F. | 0.6 | 0.7 | 1.0 | 1.4 | 1.5 |
| −20° F. | 0.5 | 0.6 | 0.7 | 1.0 | 1.2 |
| −40° F. | 0.5 | 0.6 | 0.6 | 0.8 | 1.0 |
| Dynatup | | | | | |
| Fail Pt. ('#) | 1.84 | 3.25 | 6.20 | 12.69 | 22.24 |
| Std. Dev. | 0.33 | 0.95 | 2.57 | 5.35 | 4.12 |
| Tot.E ('#) | 3.12 | 11.25 | 14.70 | 17.99 | 23.69 |
| Std. Dev. | 0.63 | 2.23 | 2.18 | 2.73 | 3.05 |
| Visc. @ 260° C. (Poise) | | | | | |
| 100/s | 5580 | 5870 | 8220 | 10360 | 13670 |
| 500/s | 2280 | 2530 | 2970 | 3590 | 4270 |
| 1000/s | 1480 | 1640 | 1830 | 2170 | 2590 |
| Tensile | | | | | |
| Yield (psi) | 5583 | 5583 | 4488 | 4043 | 3725 |
| Modulus/10^5 | 4.04 | 3.99 | 3.36 | 3.08 | 2.61 |
| % Elongation | 32 | 33 | 52 | 48 | 30 |
| Gloss @ 60° | | | | | |
| 450° F. | 43 | 47 | 47 | 39 | 27 |
| 500° F. | 39 | 44 | 49 | 52 | 46, 63* |

LGP-16 is a Lobed Graft Polymer prepared as described in Example 16.
*Variable readings obtained.

What is claimed is:

1. A process for making an impact modified resin composition comprising:

(a) emulsion polymerizing at least one vinyl monomer and a grafting agent to form a latex of rigid polymeric seeds having grafting sites thereon;

(b) emulsion polymerization of at least one diene monomer in the presence of said seeds to form a bi-lobed graft copolymer consisting of a rigid lobe and a rubbery lobe; and (c) compounding said lobed graft copolymer with a rigid polymer derived from at least one vinyl monomer to form an impact modified resin composition comprising a rigid polymeric matrix and agglomerated lobed graft copolymers, said agglomerated lobed graft copolymers being formed during compounding by mutual attraction of the rubbery lobes of the graft copolymer.

2. The process of claim 1 wherein said vinyl monomers are vinyl aromatic monomers, said grafting agent is 1,3-butadiene, and said diene monomer is 1,3-butadiene.

3. The process of claim 2 wherein said rigid polymeric seeds are formed from emulsion polymerizing styrene, acrylonitrile and 1,3 butadiene, said rigid polymeric matrix is a styrene acrylonitrile copolymer.

4. The process of claim 1 wherein said bi-lobed graft copolymer is present at a level of from 30 to 70 percent by weight based on the total weight of the composition.

* * * * *